United States Patent [19]

Someya et al.

[11] Patent Number: 5,128,705
[45] Date of Patent: Jul. 7, 1992

[54] FOCUS ADJUSTING CONTROL DEVICE

[75] Inventors: Hiromi Someya; Akihiko Nagano, both of Kanagawa; Kazuki Konishi, Tokyo; Tokuichi Tsunekawa, Kanagawa, all of Japan

[73] Assignee: Canon Kabushiki Kaisha, Tokyo, Japan

[21] Appl. No.: 726,736

[22] Filed: Jul. 2, 1991

Related U.S. Application Data

[63] Continuation of Ser. No. 640,583, Jan. 14, 1991, abandoned, which is a continuation of Ser. No. 553,362, Jul. 17, 1990, abandoned, which is a continuation of Ser. No. 344,403, Apr. 28, 1989, abandoned.

[30] Foreign Application Priority Data

May 2, 1988 [JP] Japan .................. 63-109519

[51] Int. Cl.$^5$ ............................................. G03B 13/36
[52] U.S. Cl. .................................. 354/400; 354/402; 354/432

[58] Field of Search ............... 354/400, 402, 408, 409, 354/432

[56] References Cited

U.S. PATENT DOCUMENTS

4,614,975  9/1986  Kaite .................................. 354/402
4,827,303  5/1989  Tsuboi ............................... 354/409

Primary Examiner—Russell E. Adams
Attorney, Agent, or Firm—Fitzpatrick, Cella, Harper & Scinto

[57] ABSTRACT

A focus adjusting control device for adjusting the focal point of an optical system for an object captured at a sighting part of a picture plane specified by the optical system is provided with a selecting circuit for selecting the position of the sighting part on the picture plane, and a focus adjustment part arranged to begin, in response to a selecting action of the selecting circuit, a focus adjusting action corresponding to the position of the sighting part selected by the selecting circuit.

54 Claims, 4 Drawing Sheets

FOCUS ADJUSTING CONTROL DEVICE

This application is a continuation of application Ser. No. 07/640,583 filed Jan. 14, 1991, now abandoned which is a continuation of Ser. No. 07/553,362, filed Jul. 17, 1990, now abandoned, which is a continuation of Ser. No. 07/344,403, filed Apr. 28, 1989, all now abandoned.

BACKGROUND OF THE INVENTION

1. Field of the Invention

This invention relates to a focus adjusting control device for adjusting the focal point of optical means for an object which is captured in a sighting part of a picture plane specified by the optical means and more particularly to an improvement in a focus adjusting control device of the kind arranged to permit selection of the position of the sighting part on the picture plane.

2. Description of the Related Art

The conventional camera having an automatic focus detecting (AF) device is provided with the above-stated sighting part (hereinafter referred to as a distance measuring mark or a focus detection area) which is set near to the center of a photo-taking picture plane. In most cases, a photographing operation is performed by placing an object to be photographed at the distance measuring mark. However, the object is occasionally located in some part of the picture plane other than the central part thereof. In that case, a photographing shot would result in a blurred picture as the AF device takes aim at the above-state distance measuring mark regardless of the actual location of the object.

To solve this problem, some known cameras are arranged to permit focusing at parts other than the center of the picture plane. The camera of this kind is provided with a so-called focus lock device for enabling the photographer to first place the object at the distance measuring mark (or a focus detection area) to have the lens of the camera focus on the object and, after that, to change the composition of a picture before taking the picture with the focus position kept unchanged. However, since the layout of objects is to be adjusted after focus locking, a shutter opportunity tends to be missed.

Further, some known cameras are arranged to automatically measure distances to a plurality of objects, to obtain information on the nearest object distance from the plurality of object distances and to focus the lens on the nearest object. However, the object to be brought into focus is not always located at the nearest distance. The camera of that kind, therefore, has caused inconvenience in some cases.

Further, a camera which is arranged to have the position of the above-stated distance measuring mark shiftable within the picture plane to adjust it to the position of the object to be photographed has been disclosed in Japanese Laid-Open Patent Application No. SHO 60-18423. This camera, however, requires the focusing operation to be repeated every time the distance measuring mark is shifted from one position to another and is thus considered unsatisfactory in terms of operability.

SUMMARY OF THE INVENTION

This invention is directed to a solution of the above-stated problems of the prior art. It is therefore a principal object of the invention to provide a focus adjusting control device which is capable of solving these problems in adjusting the focal point of an optical means for an object captures in the sighting part of a picture plane specified by the optical means. To attain this object a focus adjusting control device according to the invention is provided with selecting means for selecting the position of the sighting part on the picture plane; and focus adjusting means which is arranged to begin, in response to the selecting action of the selecting means, to adjust the focal point for the sighting part selected by the selecting means. The position of the sighting part within the picture plane is thus arranged to be selectable according to the position on the picture plane of the object which is to be brought into focus. The focus adjusting action for a newly selected position of the sighting part is arranged to automatically begin. Therefore, the focus adjusting control device according to this invention permits a focus adjusting operation to be quickly and easily performed while the composition of a picture is freely determined.

Other objects and features of the invention will become apparent from the following detailed description of embodiments thereof taken in connection with the accompanying drawings.

DETAILED DESCRIPTION OF THE PREFERRED EMBODIMENTS

First Embodiment of the Invention

A focus detecting optical system having three focus detection areas according to the invention is arranged as described below with reference to FIG. 4.

Figures 4, 5:
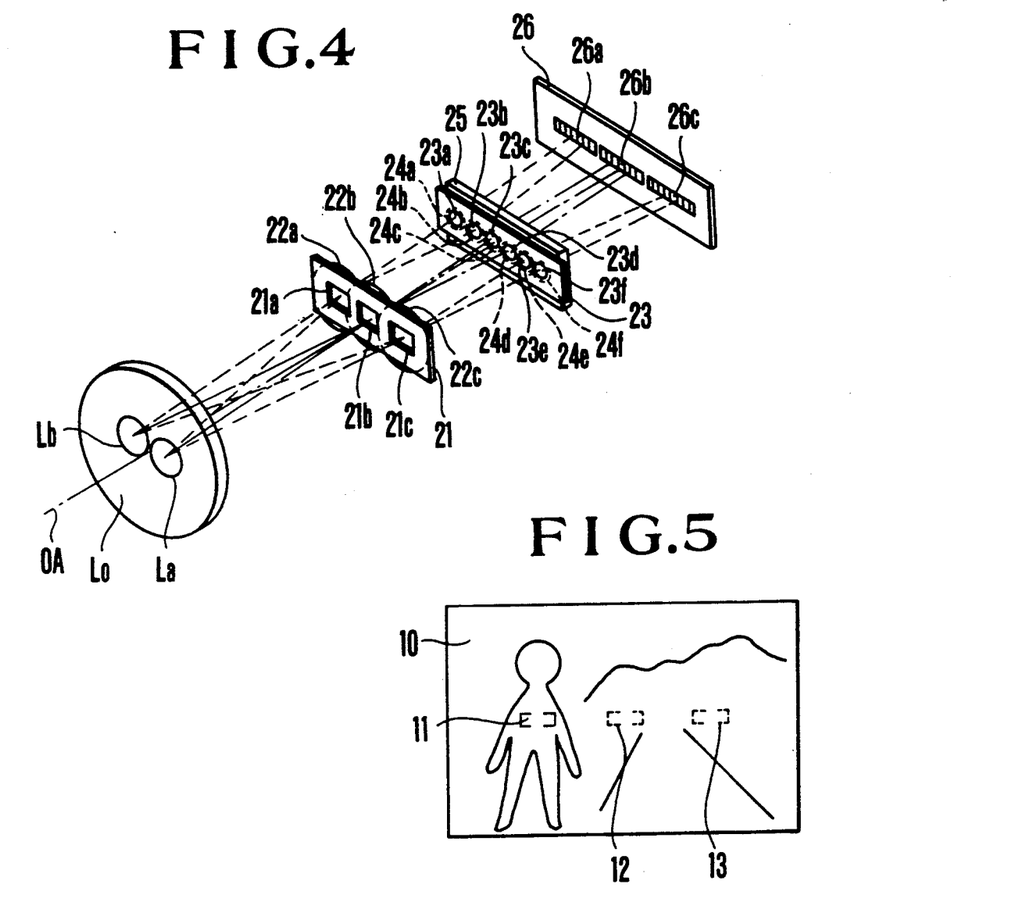
FIG. 4 shows by way of example the arrangement of the focus detecting optical system of the embodiment.
FIG. 5 an illustration of a display made within the viewfinder of the first embodiment.

In FIG. 4, a reference symbol Lo denotes a photo-taking lens. Symbols La and Lb denote areas on a pupil plane through which focus detection light fluxes are passed. A focus detection area mask 21 is disposed just behind a prescribed focal plane. The mask 21 is provided with apertures 21a, 21b and 21c for determining three focus detections areas 11, 12 and 13 on a photo-taking image plane (or picture plane) as shown in FIG. 5.

Condenser lenses 22a, 22b and 22c are disposed just behind the apertures 21a, 21b and 21c provided in the above-stated focus detection area mask 21. These condenser lenses 22a, 22b and 22c are arranged to form the image of stop masks 23a to 23f within the exit pupil of the photo-taking lens Lo. The images of the stop masks 23a and 23b are formed by the condenser lens 22a in the areas La and Lb within the exit pupil of the photo-taking lens Lo. The images of the stop masks 23c and 23d are formed by the condenser lens 22b in the areas La and Lb within the exit pupil of the photo-taking lens Lo. The images of the stop masks 23e and 23f are formed by the condenser lens 22c in the areas La and Lb within the exit pupil of the lens Lo respectively. The stop masks 23a to 23f are thus arranged to determine the focus detection light flux areas La and Lb within the exit plane of the photo-taking lens Lo.

Image forming lenses 24a to 24f are respectively disposed just behind the stop masks 23a to 23f. These image forming lenses 24a to 24f are arranged to secondarily form, on a line sensor 26, the images formed near to the focal plane F of the photo-taking lens Lo. Just behind the image forming lenses 24a to 24f is disposed a cylindrical lens 25 which has a refracting power only in a direction perpendicular to the direction in which the stop masks 23a to 23f are aligned. The lens 25 is thus arranged to cause images obtained in that direction to be formed on the line sensor 26 in a contracted state. The line sensor 26 is in a shape which is shorter in the vertical direction than in the lateral direction in which the stop masks 23a to 23f are aligned. Therefore, the cylindrical lens 25 is arranged to cause the image to shrink to a greater degree in the vertical direction than in the lateral direction in such a way as to have the focus detection areas enlarged in the vertical direction. However, this arrangement is not mandatory. Image sensors 26a to 26c are composed of one-dimensional sensors such as CCDs or the like. The sensor 26a is disposed in a position to receive the images formed by the image forming lenses 24a and 24b. The sensor 26b is in a position to receive the images formed by the image forming lenses 24c and 24d. The sensor 26c is in a position to receive the images formed by the image forming lenses 24e and 24f. Therefore, the sensors 26a, 26b and 26c are arranged to permit focus detection separately in three different areas on the photo-taking image plane as focus detection areas 11, 12 and 13 respectively.

FIG. 5 shows by way of example a display made within a viewfinder. In FIG. 5, a reference numeral 10 denotes the whole image of a visual field specified by the photo-taking lens Lo. Small areas 11, 12 and 13 indicated by broken lines or full lines represent the above-stated focus detection areas. While the embodiment is arranged to have three focus detection areas, the number of focus detection areas is not limited to three. The area display is made by means of display elements which are, for example, guest-host liquid crystal elements. The area display is arranged to be colored when the display element of one of the focus detection areas selected by a focus detection area selecting operation which will be described later is energized. This enables the photographer to confirm the selected focus detection area through the viewfinder. In FIG. 5, the focus detection area 11 which is indicated by a full line represents the selected (colored) focus detection area.

Figure 2:
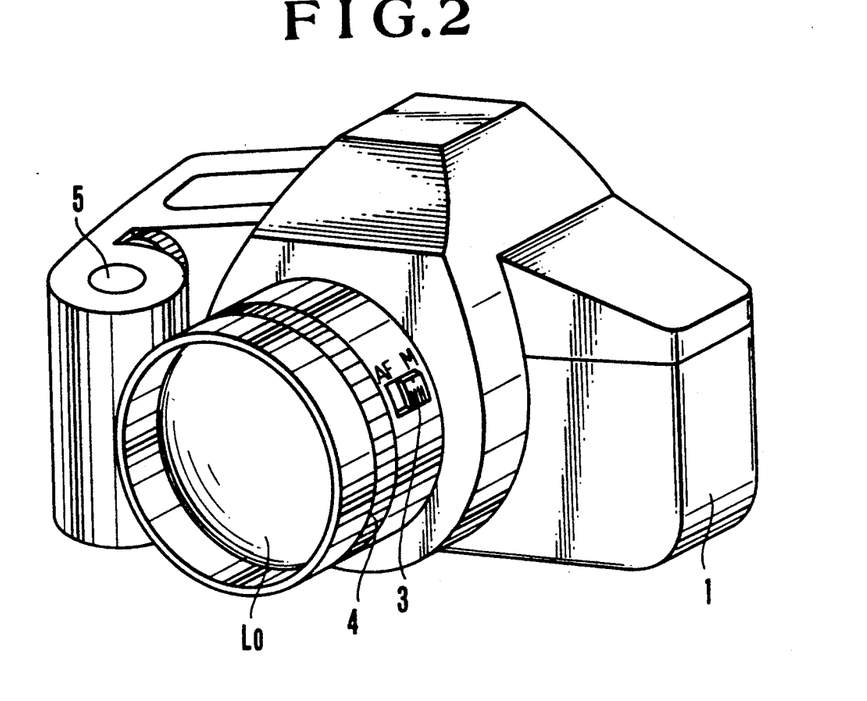
FIG. 2 is an oblique view showing the external appearance of a camera arranged according to the invention as the first embodiment thereof.

FIG. 2 shows in an oblique view the external appearance of the camera arranged as the first embodiment. Referring to FIG. 2, the illustration includes a camera body 1; the above-stated photo-taking lens Lo; an AF-M change-over lever 3 which is provided for selection between an automatic focusing operation (hereinafter referred to as AF operation) and a manual focusing operation; a manual focus ring 4 which is to be used for the manual focusing operation; a shutter release switch 5 which is arranged in a known manner to be operated in two steps in such a manner that: a first stroke of operation on the switch 5 causes light measuring and distance measuring actions to be performed; and a second stroke of operation actuates a shutter release action.

Figure 3:
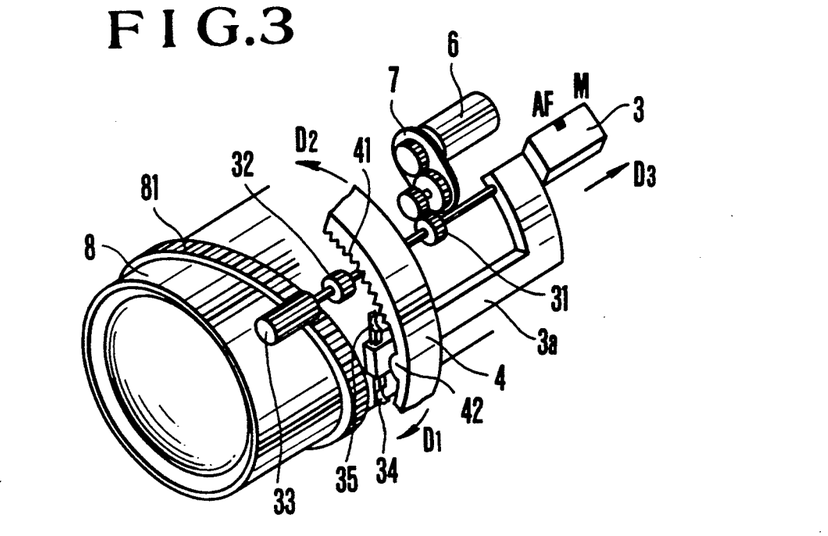
FIG. 3 is an oblique view showing by way of example the arrangement of a focus detection area change-over mechanism of the embodiment.

FIG. 3 shows the details of the AF-M change-over mechanism of the first embodiment. The illustration includes the AF-M change-over lever 3 which is shown in FIG. 2; the manual focus ring 4 which is also shown in FIG. 2; and a motor 6 which is arranged to drive a focus lens 8 included in the above-stated photo-taking lens Lo in the case of the AF operation in response to a control signal received from a control circuit which will be described later. The driving force of the motor 6 is transmitted to the gear part 81 of the focus lens 8 first via a gear train 7 and then via transmission gears 31 and 33 which are rotatably attached to the AF-M change-over lever 3.

The AF-M change-over lever 3 is provided with an arm part 3a which extends from the lever 3 and is arranged to have its fore end confront the inner circumferential face of the manual focus ring 4 under the condition of the AF operation mode shown in FIG. 3. A pair of focus detection area change-over switches 34 and 35 are disposed on the two circumferential sides of the arm part 3a. On the inner circumferential side of the manual focus ring 4, there is provided a projection 42 which is arranged to operate these switches 34 and 35 by coming into contact with them. Under the condition shown in FIG. 3, the switches 34 and 35 and the projection 42 are in a first state in which both the switches 34 and 35 are turned off. A second state is obtained when the manual focus ring 42 is rotated in the direction of arrow D1 to bring the projection 42 into contact with the switch 34 to turn it on. A third state is obtained when the manual focus ring 42 is rotated in the direction of arrow D2 to turn on the switch 35 by thus bringing the projection 42 into contact with the switch 35. One of these three different states is selected in the above-stated manner. As a result, one of the focus detection areas 11, 12 and 13 shown in FIG. 5 is selectively colored.

In the case of the first embodiment, the manual focusing operation becomes possible when the AF driving gear train 7 and the transmission gear 31 are disengaged from each other by moving the AF-M change-over lever 3 in the direction of arrow D3. Further, the switches 34 and 35 are provided at the fore end of the arm part 3a which is formed in one body and which extend from the AF-M change-over lever 3 as mentioned above. This arrangement enables these switches 34 and 35 to be moved out of the confronting relation with respect to the manual focus ring 4 by moving the AF-M change-over lever 3 in the direction of arrow D3 as shown in FIG. 3. Therefore, the switches 34 and 35 will never be operated when the manual focus ring 4 is rotated. Further, the change-over operation causes the gear part 41 of the manual focus ring 4 to engage the transmission gear 32 which is rotatably attached to the AF-M change-over lever 3. Then, the focus lens 8 can be driven through the transmission gears 32 and 33 by rotating the manual focus ring 4.

Figure 1:
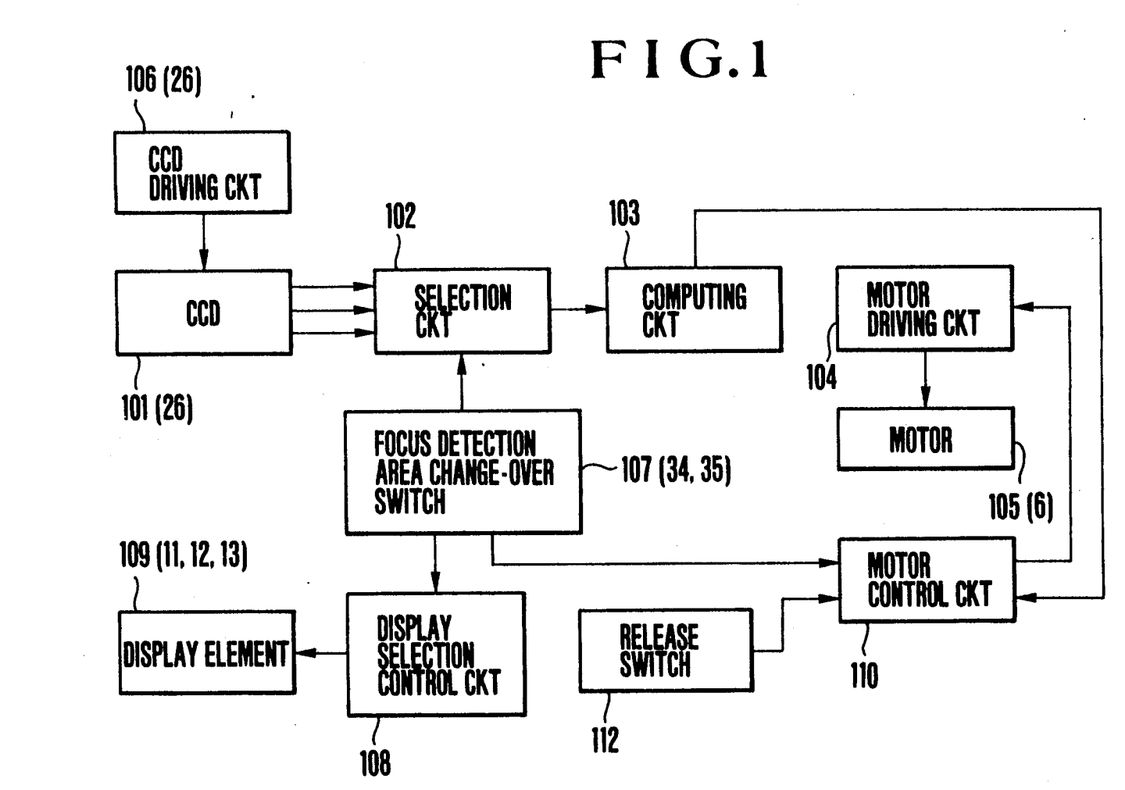
FIG. 1 is a block diagram of the circuits of a first embodiment of the invention showing a relation between selection of a focus detection area and a focus detecting action.

FIG. 1 shows in a circuit block diagram the circuits for performing the change-over action in the first embodiment. The change-over action selects one of the focus detection areas in association with the focus detecting action which is performed in response to the change-over action. The illustration includes a CCD 101 which is employed as a focus detection element (corresponding to the line sensor 26 of FIG. 4); a CCD driving circuit 106 which is arranged to drive and control the CCD 101; a selection circuit 102 which is arranged to select one of signals which has been output from the CCD 101 and which corresponds to the focus detection area (for example the area 11 of FIG. 5) selected by a focus detection area change-over switch 107 which corresponds to the switches 34 and 35 of FIG. 3; a known computing circuit 103 which is arranged to compute the signal which has been output from the CCD 101 and selected by the selection circuit 102 to find the degree to which the focus lens is to be moved for the purpose of focusing; a motor driving circuit 104 which is arranged to drive a motor 105 which corresponds to the motor 6 of FIG. 3; a display selection control circuit 108 which is arranged to cause a display element 109 (corresponding to the element 11, 12 or 13 of FIG. 5) which is provided for the focus detection area selected by the focus detection area change-over switch 107; and a motor control circuit 110. The motor control circuit 110 is arranged to control through the motor driving circuit 104 the driving, stopping and rotating degree of the motor 105 in accordance with a signal received from the focus detection area change-over switch 107 and a lens moving degree signal from the computing circuit 103.

In the case of the first embodiment, the signal from the focus detection area change-over switch 107 is arranged to be supplied to the motor control circuit 110. This arrangement enables the device to perform focus adjustment without delay on the basis of the focus detection area when the area is selected by the switch 107.

In the conventional ordinary camera, a focusing (focus adjustment) action is arranged to begin when a shutter release switch is pushed down to a first stroke and to come to an end when a photo-taking lens reaches an in-focus position. Therefore, in the event of change-over from one focus detection area over to another, the conventional arrangement requires a complex operation, because it requires the release switch to be turned off after completion of each focus detection area change-over and to be again pushed down to the first stroke.

Whereas, this invention enables the focus detection area change-over (or switching) to be effectively and readily accomplished without any additional operation.

More specifically, a first method for operating the structure of the FIG. 1 embodiment is as follows: While the release switch 112 shown in FIG. 1 is left in its first-stroke depressed position, a new focus adjusting action is allowed to begin according to change-over information (a signal) output from the focus detection area change-over switch 107. A second method is as follows: A new focus adjusting action is allowed to begin according to the change-over information from the focus detection area change-over switch 107 irrespectively of the release switch 107. The focus adjusting action comes to an end when the photo-taking lens reaches an in-focus position. The multi-point focus adjustment thus can be advantageously performed by this arrangement.

For example, assuming that the focus detection area 12 which is located in the center of the viewfinder as shown in FIG. 5 is to be selected in a standard state and that the area 12 is switched over to the focus detection area 11 or 13 when the switch 34 or 35 of FIG. 3 is turned on, the embodiment operates as follows: A focus detecting action is performed first for the focus detection area which has already been selected by a normal depressing operation on the release button (or switch).

In changing this focus detection area over to another, a signal obtained by turning on or off the focus detection area change-over switch 34 or 35 is supplied to the motor control circuit 110. This signal causes focus adjustment to begin on the basis of the output of the computing circuit 103.

Generally, the focus detection area which is located in the center of the viewfinder in the standard state is most often used for focus adjustment. In view of this, the invented device may be arranged in the following manner in a case where the manual focusing mode is switched over to the automatic focusing mode: In this instance, the manual focus ring 4 is moved by means of a cam or the like in response to the movement of the AF-M change-over lever of FIG. 3 in such a way as to bring the focus detection area change-over switch 107 back into its initial position for obtaining the standard state when the manual focusing mode is switched over to the automatic focusing mode.

The first embodiment which is arranged in the above-stated manner operates as follows: When a power supply (which is not shown) is switched on, a current is supplied to each circuit. To determine the composition of a picture to be taken, the photographer takes a look at the inside of the viewfinder. Then, with the manual focus ring 4 assumed to be in a position as shown in FIG. 3 and the focus detection area 12 assumed to be on display, if the focus obtained by pushing the release switch 112 down to its first stroke position is on the background, the main object to be photographed might be too blurred for determining the composition of the picture. In such a case, the focus detection area change-over switch 34 is turned on by rotating the manual focus ring 4 to the left. This causes the display selection control circuit 108 to cause the display of the focus detection area 12 put out and to have the focus detection area 11 on display. At the same time, a signal indicative of the turned-on state of the focus detection area change-over switch 34 causes the selection circuit 102 to select the output of the CCD 101 corresponding to the focus detection area 11. Then, the output of the CCD 101 is computed by the computing circuit 103. The computing circuit 103 supplies the motor control circuit 110 with a signal indicative of a predetermined lens shifting degree. Meanwhile, the signal from the focus detection area change-over switch 107 is supplied also to the motor control circuit 110. In response to this signal, the motor control circuit 110 supplies the motor driving circuit 104 with information on the lens shifting degree along with a driving start signal. The motor 105 begins to operate accordingly. The driving force of the motor 105 is transmitted via the gear train 7 and the transmission gears 31 and 33 to the focus lens 8. Focus adjustment is performed accordingly. As a result, the viewfinder shows an image having the main object in a focused state. The embodiment thus enables the photographer to instantly determine the composition of the picture.

In the event of manual focusing, the AF-M change-over lever 3 is shifted to its one position M. This disengages the gear train 7 from the transmission gear 31 as mentioned in the foregoing. Then, the focus detection change-over switches 34 and 35 of the AF-M change-over lever 3 are moved away from their positions corresponding to the projection 42 provided on the manual focus ring 4. The manual focus ring 4 then engages the transmission gear 32. After that, the focus lens 8 can be manually driven through the transmission gears 32 and 33 by rotating the manual focus ring 4 without any load resulting from kicking of the motor.

Second Embodiment

Figure 6:
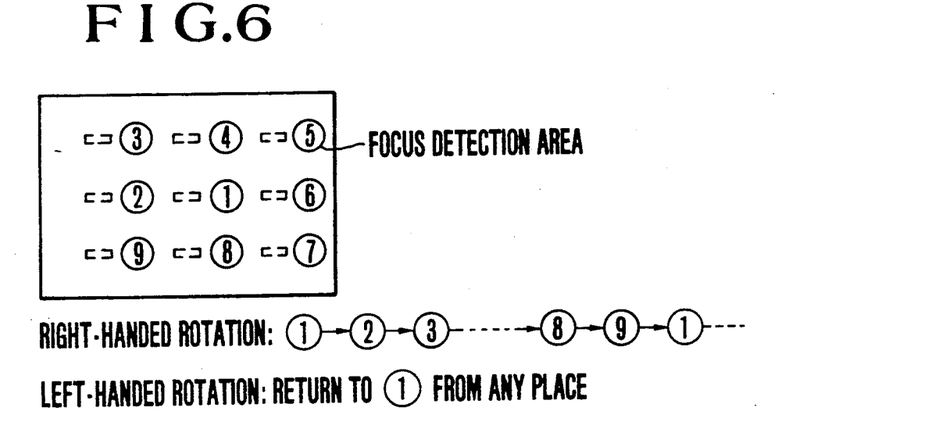
FIG. 6 is an illustration of a display made within the viewfinder of a second embodiment of the invention.
Figure 7:
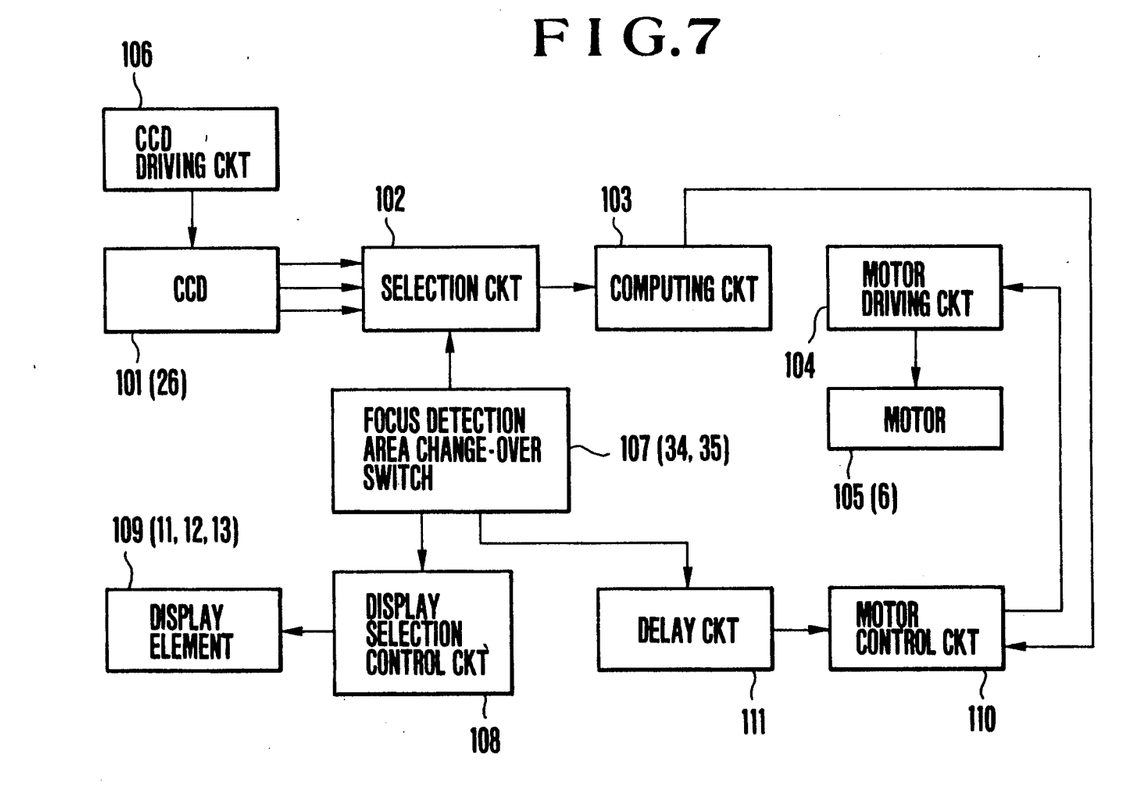
FIG. 7 is a block diagram showing the circuits of the second embodiment including a delay circuit.

In the first embodiment, the three specific parts of the image (picture) plane are arranged to be usable for focus detection and distance measurement. In a case where a greater number of areas are provided for focus detection, there would be no problem if any one of these area is directly selectable. In actuality, however, it is hardly possible to directly select one area from among many areas while looking at the inside of the viewfinder. In view of this difficulty, these focus detection areas are generally arranged to be selected by turns, for example, as indicated by circled reference numerals 1 to 9 in FIG. 6. Besides, this selecting method permits a simpler arrangement of the device. However, the method of selecting the focus detection areas by turns presents the following problem: In a case where the lens is desired to be focused on the focus direction area indicated by ⑤, if the device is arranged in the same manner as in the case of the first embodiment and if the area ① is located in the first place, the lens is focussed on the area ② by rotating the manual focus ring 4. After that, with the manual focus ring 4 likewise further rotated, the areas ③, ④ and ⑤ come into focus by turns. The focus detection area selecting operation thus becomes quite troublesome. To solve this problem, the second embodiment of the invention is provided with a delay circuit 111 (including a timer or the like) as shown in FIG. 7 in addition to the arrangement shown in FIG. 1. The delay circuit 111 is disposed in a signal channel arranged to allow a signal indicative of a desired focus detection area to be used for the focus detecting action. The delay circuit 111 enables the photographer to know whether the focus detection area selecting action is still in process or has been completed.

With the delaying means thus active between the receipt of the focus detection area change-over signal and the start of new focus adjustment, the second embodiment eliminates the above-stated troublesomeness of the focus detection area change-over operation. Further, if the inside display of the view-finder is arranged to be delayed by the delay means, a discrepancy in timing would arise between the focus detection area change-over and the view-finder display to impair the operability of the camera. Therefore, as mentioned in the foregoing, the view finder display change-over is preferably arranged to be immediately carried out in response to the focus detection area change-over with the delay means provided between the focus detection area change-over signal and the start of the focus adjustment as mentioned above.

Third Embodiment

The second embodiment is arranged to eliminate the troublesomeness of the focus detection area change-over operation by the provision of delay means between the focus detection area change-over signal and the start of focus adjustment as mentioned in the foregoing. The same advantageous effect is also attainable by a different arrangement. A third embodiment of this invention is arranged to attain the same effect in the following manner: The focus adjusting action is newly performed when the focus detection area change-over signal is received for the first time. However, when the focus detection area change-over signal is received the next time, focus detecting and lens driving processes are immediately suspended to give priority to the focus detection area change-over signal by means of a priority circuit. The use of this priority circuit enables the camera to adequately cope with a case where the photographer is hesitating to change one focus detection area over to another. In addition to this advantage, the third embodiment cancels out a delay caused by the delay means. More specifically, when the change-over signal of the focus detection area change-over switch 107 is supplied to the motor control circuit 110 in the circuit arrangement shown in FIG. 1, the priority circuit which is included in the motor control circuit 110 enables the circuit 110 to cause the motor driving circuit 104 to suspend a preceding driving action and to newly perform a driving action in accordance with a lens shifting degree signal newly obtained from the computing circuit 103.

In each of the embodiments described, the signal which has been output from the focus detection area change-over switch 107 for causing the focus adjusting action to begin is arranged to control the motor control circuit 110. The arrangement, however, may be changed to have this signal used for controlling the computing circuit 103 and the CCD driving circuit to initiate thereby the focus adjusting action when one of the focus detection areas is selected.

While the invention is applied to the focus adjustment of a camera in the case of the embodiments described, the invention is of course applicable also to optical apparatuses other than cameras.

What is claimed is:
1. A focus adjusting control device for adjusting a focal point of optical means for an object captured at a sighting part of a field of view specified by said optical means or a camera having the focus adjusting control device, comprising:
    a) selecting means for selecting a position of said sighting part in said field of view;
    b) first actuating means for automatically commencing, in response to a selecting action of said selecting means, a focus adjusting action corresponding to said sighting part selected by said selecting means; and
    c) second actuating means for commencing, irrespective of the selecting action of said selecting means, said focus adjusting action corresponding to said sighting part selected by said selecting means.

2. A device according to claim 1, further comprising timer means for delaying the response of said first actuating means to the selecting action of said selecting means.

3. A device or a camera according to claim 1, wherein said selecting means includes manual operation means for manual operation of said selecting means.

4. A device or a camera according to claim 3, wherein said selecting means includes means for causing an operation direction of said manual operation means to correspond to a selection direction of the position of said sighting part.

5. A device or a camera according to claim 1, wherein said selecting means includes operation means of an up and down type.

6. A device or a camera according to claim 1, wherein said selecting means includes exterior operation means for operation from outside said device or camera.

7. A device or a camera according to claim 6, wherein said selecting means includes means for causing an operation direction of said exterior operation means to correspond to a selection direction of the position of said sighting part.

8. A device or a camera according to claim 1, wherein said selecting means includes manual operation means which also functions as operation means for manual focal adjustment.

9. A device or a camera according to claim 1, wherein said second actuating means includes means for responding to a shutter release button.

10. A device or a camera according to claim 1, wherein said second actuating means includes means for responding to a shutter release operation.

11. A device or a camera according to claim 1, further comprising display means for displaying an indication in response to said selecting means.

12. A device or a camera according to claim 1, further comprising display means for displaying the position of said sighting part selected by said selecting means.

13. A device or a camera according to claim 12, wherein said display means includes means for displaying said display within a finder.

14. A device or a camera according to claim 1, wherein said first actuating means includes means for preferring a focus adjusting action on said sighting part selected by said selecting means when a selection action by said selecting means is effected during a focus adjusting operation.

15. A device or a camera according to claim 2, wherein said first actuating means includes drive means for driving the optical means and said timer means delays the operation of said drive means.

16. A control apparatus for a camera, or a camera having said control apparatus, comprising:
    a) selecting means for selecting a camera action;
    b) first actuating means for automatically commencing, in response to a selecting action of said selecting means, the camera action selected by said selecting means; and
    c) second actuating means for commencing, irrespective of the selecting action of said selecting means, the camera action selected by said selecting means.

17. An apparatus or a camera according to claim 16, further comprising timer means for delaying a response of said first actuating means to the selecting action of said selecting means.

18. An apparatus or a camera according to claim 16, wherein said first actuating means includes means for preferring a camera action selected by said selecting means when the selection action by said selecting means is performed during another camera action.

19. An apparatus or a camera according to claim 16, wherein said selecting means includes manual operation means for manual operation of said selecting means.

20. An apparatus or a camera according to claim 19, wherein said selecting means includes means for causing an operation direction of said manual operation means to correspond to a selection direction of the position of said camera action.

21. An apparatus or a camera according to claim 16, wherein said selecting means includes operation means of an up and down type.

22. An apparatus or a camera according to claim 16, wherein said selecting means includes exterior operation means for operation from outside said device or camera.

23. An apparatus or a camera according to claim 22, wherein said selecting means includes means for causing an operation direction of said exterior operation means to correspond to a selection direction of the position of said camera action.

24. An apparatus or a camera according to claim 16, wherein said selecting means includes manual operation means which also functions as operation means for manual focal adjustment.

25. An apparatus or a camera according to claim 16, wherein said second actuating means includes means for responding to a shutter release button.

26. An apparatus or a camera according to claim 16, wherein said second actuating means includes means for responding to a shutter release operation.

27. An apparatus or a camera according to claim 16, further comprising display means for displaying an indication in response to said selecting means.

28. An apparatus or a camera according to claim 16, further comprising display means for displaying the position of said camera action selected by said selecting means.

29. An apparatus or a camera according to claim 28, wherein said display means includes means for displaying said display within a finder.

30. An apparatus or a camera according to claim 16, wherein said first actuating means includes drive means for driving the camera action and further comprising timer means for delaying the operation of said drive means.

31. A focus adjusting control device for adjusting a focal point of optical means for an object captured at a sighting part of a field of view specified by said optical means or a camera having said focus adjusting control device, comprising:
    a) selecting means for selecting a position of said sighting part in the field of view;
    b) actuating means for automatically commencing, in response to a selecting action of said selecting means, a focus adjusting action corresponding to said sighting part selected by said selecting means; and
    c) timer means for delaying the response of said actuating means to the selecting action of said selecting means.

32. A device or a camera according to claim 31, wherein said selecting means includes manual operation means for manual operation of said selecting means.

33. A device or a camera according to claim 32, wherein said selecting means includes means for causing an operation direction of said manual operation means to correspond to a selection direction of the position of said sighting part.

34. A device or a camera according to claim 31, wherein said selecting means includes operation means of an up and down type.

35. A device or a camera according to claim 31, wherein said selecting means includes exterior operation means for operation from outside said device or camera.

36. A device or a camera according to claim 35, wherein said selecting means includes means for causing an operation direction of said exterior operation means to correspond to a selection direction of the position of said sighting part.

37. A device or a camera according to claim 31, wherein said selecting means includes manual operation means which also functions as operation means for manual focal adjustment.

38. A device or a camera according to claim 31, further comprising display means for displaying an indication in response to said selecting means.

39. A device or a camera according to claim 31, further comprising display means for displaying the position of said sighting part selected by said selecting means.

40. A device or a camera according to claim 39, wherein said display means includes means for displaying said display within a finder.

41. A device or a camera according to claim 31, wherein said first actuating means includes means for preferring a focus adjusting action on said sighting part selected by said selecting means when a selection action by said selecting means is effected during a focus adjusting operation.

42. A device or a camera according to claim 31, wherein said first actuating means includes drive means for driving the optical means and said timer delays the operation of said drive means.

43. A control apparatus for a camera or a camera, comprising:
   a) selecting means for selecting a camera action;
   b) means for automatically commencing, in response to a selecting action of said selecting means, said camera action selected by said selecting means; and
   c) timer means for delaying the response of said actuating means to the selecting action of said selecting means.

44. A device or a camera according to claim 43, wherein said selecting means includes manual operation means for manual operation of said selecting means.

45. A device or a camera according to claim 44, wherein said selecting means includes means for causing an operation direction of said manual operation means to correspond to a selection direction of the position of said sighting part.

46. A device or a camera according to claim 43, wherein said selecting means includes operation means of an up and down type.

47. A device or a camera according to claim 43, wherein said selecting means includes exterior operation means for operation from outside said device or camera.

48. A device or a camera according to claim 47, wherein said selecting means includes means for causing an operation direction of said exterior operation means to correspond to a selection direction of the position of said sighting part.

49. A device or a camera according to claim 43, wherein said selecting means includes manual operation means which also functions as operation means for manual focal adjustment.

50. A device or a camera according to claim 43, further comprising display means for displaying an indication in response to said selecting means.

51. A device or a camera according to claim 43, further comprising display means for displaying the position of said sighting part selected by said selecting means.

52. A device or a camera according to claim 51, wherein said display means includes means for displaying said display within a finder.

53. A device or a camera according to claim 43, wherein said first actuating means includes means for preferring a focus adjusting action on said sighting part selected by said selecting means when a selection action by said selecting means is effected during a focus adjusting operation.

54. A device or a camera according to claim 43, wherein said first actuating means includes drive means for driving the optical means and said timer means delays the operation of said drive means.

* * * * *

UNITED STATES PATENT AND TRADEMARK OFFICE
CERTIFICATE OF CORRECTION

PATENT NO. : 5,128,705
DATED : July 7, 1992
INVENTOR(S) : SOMEYA ET AL.

It is certified that error appears in the above-identified patent and that said Letters Patent is hereby corrected as shown below:

Title page, item [30] Foreign Application Priority Data:

"63-109519" should read --63-109510--.

COLUMN 1

Line 8, "all" should be deleted.
Line 32, "above-state" should read --above-stated--.

COLUMN 2

Line 2, "captures" should read --captured--.

COLUMN 4

Line 30, "ring 42" should read --ring 4--.
Line 33, "ring 42" should read --ring 4--.

COLUMN 6

Line 36, "put" should read --to be put--.

UNITED STATES PATENT AND TRADEMARK OFFICE
CERTIFICATE OF CORRECTION

PATENT NO. : 5,128,705

DATED : July 7, 1992

INVENTOR(S) : SOMEYA ET AL.

It is certified that error appears in the above-identified patent and that said Letters Patent is hereby corrected as shown below:

<u>COLUMN 8</u>

Line 48, "device" should read --device or a camera--.

Signed and Sealed this

Thirty-first Day of August, 1993

*Attest:*

BRUCE LEHMAN

*Attesting Officer*            *Commissioner of Patents and Trademarks*